July 9, 1968  H. COX ETAL  3,391,925
DOCUMENT FEEDING APPARATUS
Filed May 25, 1966
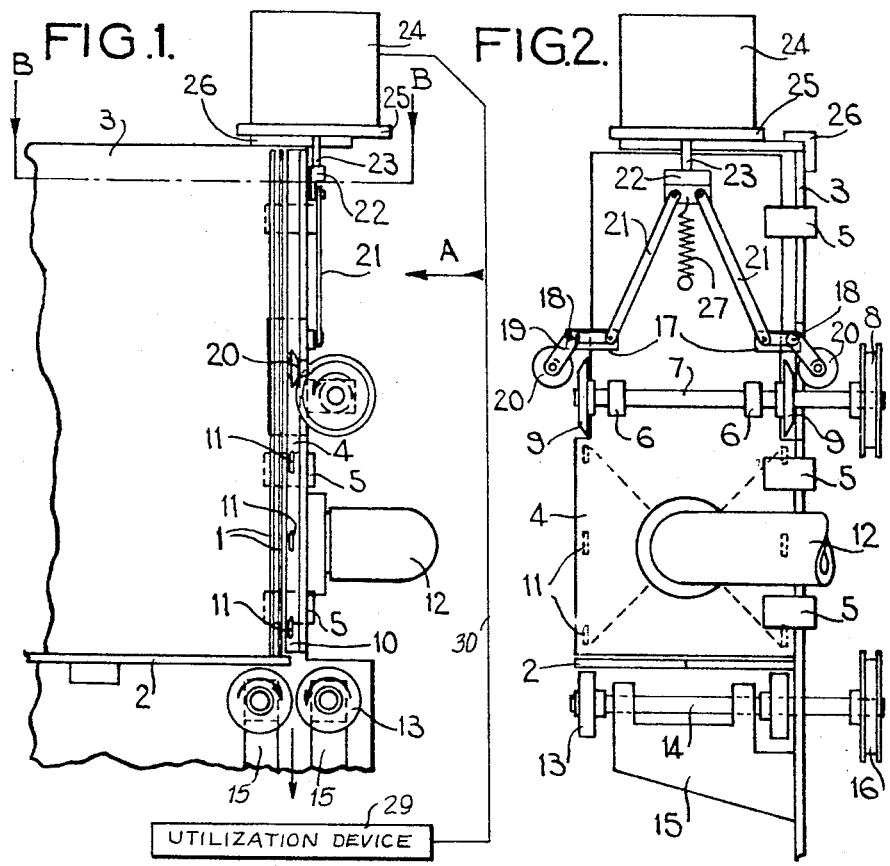
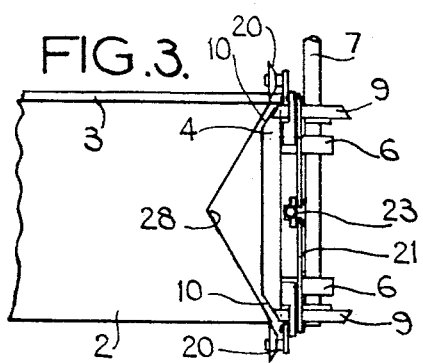
INVENTORS
HARRY COX
ALEXANDER BENNETT GOSLING
JAMES ARTHUR HOGE SHIEL
BY
Hane and Nydick
ATTORNEY United States Patent Office 3,391,925
Patented July 9, 1968

3,391,925
DOCUMENT FEEDING APPARATUS
Harry Cox, Claverdon, Alexander Bennett Gosling, Whittlesford, and James Arthur Hogg Shiel, Stevenage, England, assignors to International Computers and Tabulators Limited, London, England, a British company
Filed May 25, 1966, Ser. No. 552,778
Claims priority, application Great Britain, June 1, 1965, 23,215/65
9 Claims. (Cl. 271—20)

ABSTRACT OF THE DISCLOSURE

A document feeding apparatus is described in which a stack of documents are retained by a plate. The end of the plate is formed with an aperture between two projections, and one edge of each of the documents in the stack rests upon the plate, the documents at the feeding face of the stack resting upon the projections. The apparatus has an end wall at the feeding face of the stack and this wall has two sloping portions at right angles to the retaining plate and respectively positioned parallel to opposite edges of the document at the feeding face of the stack. Suction is applied to the sloping portions to deform this document, and in the deformed position, the leading edge of the document is brought clear of the retaining plate. Feeding rollers are inserted into the sloping portions and when a document has been deformed a pair of gripper rollers are moved by the energisation of a solenoid to hold the edges of the deformed document into contact with the feeding rollers. The feeding rollers are rotated to feed the deformed document past the projections on the retaining plate into the grip of conventional feeding rolls. In a modification of the apparatus only one edge of a document to be fed is deformed, the opposite edge being in contact with an aligning surface during movement from the stack.

---

This invention relates to document feeding apparatus.

It is an object of the invention to provide improved apparatus for feeding documents from a stack.

According to the present invention, document feeding apparatus for feeding documents from the face of a stack includes feeding means; means to deform that document at said face to bring at least one edge of the document into engagement with said feeding means; and means to hold said engaged edge in engagement with said feeding means while the document is advanced out of the stack by said feeding means in a direction parallel to said engaged edge.

One edge of the document may be brought into engagement with the feeding means, the opposite edge bearing against an aligning surface. Alternatively, the feeding means may include a pair of feeding members positioned to engage opposite edges of the document, and in this case the deforming means is arranged to bring both said opposite edges into engagement with the feeding members. The apparatus may also include a stack-retaining member having an aperture through which only a document deformed by said deforming means can pass for advancement out of the stack under the influence of said feeding means.

Apparatus embodying the present invention will now be described, by way of example, with reference to the accompanying drawing, in which FIGURE 1 is a front elevation of a document feeding device, FIGURE 2 is an end elevation of the device viewed in the direction of arrow A of FIGURE 1, and FIGURE 3 is a partial sectional view of the device on the line B—B of FIGURE 1.

Referring now to the drawings, documents 1, such as record cards (only two of which are shown), are supported, each substantially vertically, in a stack in a feed hopper. The hopper includes a support plate 2, a rear wall 3 and an end member 4 which is supported by brackets 5 attached to the wall 3. The stack of documents 1 is urged towards the member 4 by any suitable means (not shown). On its surface remote from the documents 1, the member 4 carries a pair of bearing blocks 6 which supoprt a shaft 7 which is driven, via a pulley 8, by a feeding drive (not shown). The shaft 7 carries a pair of bevelled-edge feeding rollers 9 which are positioned at the edges of the member 4 and which project through the member 4 towards the documents 1. The member 4 has edges 10 which are bevelled at an angle corresponding to the bevel on the rollers 9.

The member 4 also carries a pair of blocks 17 to each of which is attached a pivot 18. Bell crank levers 19 are pivoted about the pivots 18 and one end of each lever 19 carries a freely rotatable dished roller 20. The peripheries of the rollers 20 are shaped to conform to those of the rollers 9. The opposite end of each lever 19 is connected to a pull-rod 21 and both pull-rods 21 are connected to a common block 22 attached to the armature 23 of a solenoid 24. The solenoid 24 is mounted on a support plate 25 secured by brackets 26 to the wall 3. A spring 27 biasses the armature 23 into its un-operated position.

The member 4 is hollow and has openings 11 in the faces of the bevelled edges 10 communicating with the interior of the member 4. A vacuum pipe 12 is provided in association with the hollow member 4 and is attached to a vacuum pump (not shown).

Opposed pairs of outfeed gripper rollers 13 are carried on shafts 14 supported in bearing blocks 15 and driven by pulleys 16 from the feeding drive previously referred to.

The support plate 2 has an opening 28, the sides of which in conjunction with the bevelled edges 10 of the member 4 form a throat through which a document to be fed may pass from the stack into the outfeed rollers 13.

The operation of the device will now be considered in detail. The rollers 9 and 13 are continuously driven in the directions indicated by arrows in FIGURE 1. A stack of documents 1 is loaded into the hopper and rests on the support plate 2. Suction is applied to the pipe 12 and hence to the openings 11, with the result that the edges of the document 1 at the face of the stack are deformed to meet the edges 10. This brings the deformed edges of the document 1 into contact with the peripheries of the rollers 9. At this point the solenoid 24 is energised. Energisation of the solenoid 24 attracts the armature 23 and moves the block 22 upwards (as viewed in FIGURE 2) with the result that the levers 19 are moved, thereby swinging the rollers 20 towards the rollers 9 to hold the edges of the document 1 in engagement with the rollers 9, so that the deformed document 1 is driven downwards (as viewed in FIGURES 1 and 2) and is fed into the grip of the rollers 13 and away to a utilisation device 29, such as a card reader. At the same time, the undeformed documents 1 in the remainder of the stack remain supported by the plate 2. It will be realised that the apparatus described is an arrangement for feeding documents such as record cards from a hopper for use in a utilisation device 29. A number of utilisation devices may require the use of such a feeding arrangement. Typical of such devices are record card readers and sorters. Such devices are frequently electrically operated and a card reader for attachment to, say, a computer is frequently required to be fed with cards on the demand of the computer. It will be appreciated that the feeding of a card from the present apparatus is initiated electrically by an impulse delivered to the solenoid 24. Thus, the utilisation device 29 has a connection 30 to energise the solenoid 24 whenever feeding of a card is required.

Hence, the apparatus initially deforms that document 1 which is to be fed, thereby separating it from the stack, and then feeds the deformed document 1 by gripping it at opposite edges.

The foregoing description refers to a feeding device in which documents are fed downwards from a horizontal stack. However, the present invention is not limited to feeding devices of this kind. For example, an alternative form of construction enables documents to be fed upwards from such a stack. In this case, the support plate 2 at the bottom of the stack would not require the opening 28. Instead, the documents 1 would be deformed as before and fed by rollers 9 rotating in the opposite direction to that shown. The openings 11 in the bevelled edges of the member 4 would be arranged towards the upper part of the member 4. The support plate 25 for the solenoid 24 would be modified to allow the selected document 1 to pass out of the hopper, and the outfeed rollers 13 would be at the top of the apparatus instead of in the position shown. In this case a throat is not required, the document 1 passing straight out of the top of the stack.

The invention may also be applied to apparatus for feeding from stacks which are not substantially horizontal. For example, documents may be fed from the bottom of a vertical stack, or from a stack inclined at any other intermediate angle.

It will be appreciated that where the stack is either horizontal or is at such a small angle to horizontal that the documents 1 in the stack are not advanced towards the member 4 under the influence of gravity, it is necessary to apply some form of stack feed, such as a spring-loaded pressure plate, to ensure that the documents are available in succession at the deforming position.

The apparatus may be considerably simplified by providing only a single roller 9 at one edge of the document 1. In this case, only one bevelled edge 10 is required on the member 4 and only a single dished roller 20 is required. The rear wall 3 of the hopper may then be used as an aligning surface and the roller 9 is then preferably positioned to engage the edge of the document 1 opposite that which bears upon the wall 3. A short alignment guide (not shown) may then be provided to engage the trailing end of the engaged edge at least until the leading edge of the selected document is gripped by the outfeed rollers 13. This form of construction aids in the prevention of skew as the document 1 is fed out of the stack, and under these circumstances the outfeed rollers 13 may consist of, for example, a single pair of rollers engaging the document 1 along its centre line.

In order to make the stack of documents 1 bear against the wall 3 so that the wall 3 aligns the stack, the feeding device is preferably tilted transversely.

Since this invention is concerned with the feeding of documents from a stack, the drawing does not show the processing of the documents 1 in the utilization device 29 beyond the rollers 13. However, after leaving the stack the documents 1 may be fed past a reading station and then guided, for example by means of a roller, into a stacker. The documents 1 may, on entry into the stacker, be decelerated by contact with constantly rotating rollers; by being guided into contact with the other documents in the stack in such a way that an entering document meets increasing frictional resistance; and/or by striking a pad of resilient material which is selected, in dependence upon the speed of entry of the document, so that the document is stopped without damaging its leading edge. The entrance to the stacker may be provided with a hook behind which each entering document is retained to ensure that a document does not rebound into the path of the next entering document. The bed of the stacker may be inclined at a small angle to the horizontal and may be constantly vibrated so that the documents are thrown up the bed away from the entrance.

What is claimed is:
1. Document feeding apparatus for feeding documents successively each with one edge leading from one face of a stack, including means for supporting the stack of documents, having a first member positioned with one surface parallel to and closely adjacent that document at one face of the stack and a stack-retaining member substantially perpendicular to said first member positioned parallel to the leading edges of the documents in the stack, the stack-retaining member being shaped to have at least one projection extending outwardly with respect to said one face of the stack, the projection normally obstructing the passage of documents out of the stack; a second surface on said first member defining a document deformation position; means for deforming at least one part of that document at said one face of the stack into said deformation position, only the deformed document being unobstructed by said projection; feeding means arranged to feed an engaged document by friction out of the stack; feed control means moveable to engage at least one edge of the deformed document with said feeding means; and means for moving said feed control means.

2. Apparatus as claimed in claim 1, in which said stack-retaining member has an aperture bounded by two projections through which aperture only a document deformed by said deforming means can pass for advancement out of the stack under the influence of said feeding means.

3. Apparatus as claimed in claim 1, in which the feeding means includes a feeding roller for each engaged edge.

4. Apparatus as claimed in claim 3, in which said feed control means includes a further roller for each feeding roller, said further roller being movable into contact with said engaged edge to press said engaged edge against the feeding roller.

5. Apparaus as claimed in claim 4, including a solenoid linked to said further roller and energisable to move said further roller into contact with said engaged edge.

6. Apparatus as claimed in claim 3, in which the deforming means includes means to apply suction to the document to draw at least one edge of the document into contact with said feeding means.

7. Apparatus as claimed in claim 1, including at least one pair of outfeed rollers into the grip of which the deformed document is fed by the feeding means.

8. Apparatus as claimed in claim 1 in which the stack supporting means further includes an aligning surface substantially perpendicular to said stack retaining member and aligned in the direction of feeding of the documents, one edge of each of the documents in the stack being in contact with said aligning surface, and in which the opposite edge of a document is deformed by the deforming means, the feeding means engaging each document to be fed by said opposite edge to feed the document out of the stack with said one edge in contact with said aligning surface.

9. Apparatus as claimed in claim 1 in which said first member has two surfaces defining deformation positions respectively for each of two opposite edges of a document, and in which said opposite edges are deformed by said deforming means, the feeding control means being arranged to engage both said opopsite edges with said feeding means.

References Cited
UNITED STATES PATENTS 2,817,517  12/1957  Wittkuhns _____ 271—23

RICHARD E. AEGERTER, *Primary Examiner.*